(12) United States Patent
Smereka et al.

(10) Patent No.: US 9,722,781 B2
(45) Date of Patent: Aug. 1, 2017

(54) VEHICLE SOFTWARE UPDATE VERIFICATION

(71) Applicant: Myine Electronics, Inc., Ferndale, MI (US)

(72) Inventors: Scott Smereka, Warren, MI (US); Justin Dickow, Royal Oak, MI (US); Joel J. Fischer, Royal Oak, MI (US); Jacob R. Sigal, Ferndale, MI (US)

(73) Assignee: Livio, Inc., Royal Oak, MI (US)

( * ) Notice: Subject to any disclaimer, the term of this patent is extended or adjusted under 35 U.S.C. 154(b) by 115 days.

(21) Appl. No.: 14/326,713

(22) Filed: Jul. 9, 2014

(65) Prior Publication Data

US 2016/0013934 A1 Jan. 14, 2016

(51) Int. Cl.
*H04L 9/08* (2006.01)
*G06F 9/445* (2006.01)
*H04L 9/32* (2006.01)
*G06F 21/57* (2013.01)
*H04W 4/00* (2009.01)
(Continued)

(52) U.S. Cl.
CPC ............. *H04L 9/0819* (2013.01); *G06F 8/65* (2013.01); *G06F 21/572* (2013.01); *H04L 9/0825* (2013.01); *H04L 9/0891* (2013.01); *H04L 9/32* (2013.01); *H04L 67/34* (2013.01); *H04W 4/001* (2013.01); *G06F 2221/2107* (2013.01); *G06F 2221/2111* (2013.01); *H04L 67/12* (2013.01);
(Continued)

(58) Field of Classification Search
CPC ....... H04L 9/0819; H04L 9/32; H04L 9/0825; H04L 9/0891; H04L 2209/84; H04L 67/34; H04L 67/12; G06F 8/65; G06F 21/572; G06F 2221/2107; G06F 2221/2111; H04W 4/001; H04W 4/046; H04W 12/02
USPC ........................................................ 713/171
See application file for complete search history.

(56) References Cited

U.S. PATENT DOCUMENTS

| | | | |
|---|---|---|---|
| 7,366,589 B2 * | 4/2008 | Habermas | G06F 8/65 |
| | | | 701/1 |
| 8,214,653 B1 | 7/2012 | Marr et al. | |

(Continued)

OTHER PUBLICATIONS

National Institute of Standards and Technology (NIST), Federal Information Processing Standards Publication (FIPS PUB 186-3) Digital Signature Standard (DSS) Category: Computer Security Subcategory: Cryptography Jun. 2009, pp. 1-119.*

*Primary Examiner* — Theodore C. Parsons
*Assistant Examiner* — Thomas Ho
(74) *Attorney, Agent, or Firm* — Jennifer M. Stec; Brooks Kushman P.C.

(57) ABSTRACT

A mobile device may be associated with a vehicle for verification of software updates. The mobile device may be configured to receive a message including an encryption key with which a software update for the vehicle is encrypted, provide a user interface requesting user verification of installation of the software update, and responsive to receipt of the user verification, provide the encryption key to the vehicle to allow the vehicle to decrypt the software update. An update server may be configured to send a software update encrypted using an encryption key to a vehicle, receive a request from the vehicle requesting that the encryption key used to encrypt the software update be provided to a mobile device associated with the vehicle for verification of software updates, and send the encryption key to the mobile device responsive to the request.

12 Claims, 9 Drawing Sheets

(51) Int. Cl.
  *H04L 29/08* (2006.01)
  *H04W 4/04* (2009.01)
  *H04W 12/02* (2009.01)
(52) U.S. Cl.
  CPC ......... *H04L 2209/84* (2013.01); *H04W 4/046* (2013.01); *H04W 12/02* (2013.01)

(56) References Cited

U.S. PATENT DOCUMENTS

| | | | | |
|---|---|---|---|---|
| 8,250,377 | B2* | 8/2012 | Png | G06F 21/10 370/335 |
| 2003/0036918 | A1* | 2/2003 | Pintsov | G06Q 20/04 705/1.1 |
| 2003/0185398 | A1* | 10/2003 | Hypponnen | G06F 21/79 380/277 |
| 2005/0021968 | A1 | 1/2005 | Zimmer et al. | |
| 2005/0232422 | A1* | 10/2005 | Lin | H04K 1/00 380/255 |
| 2006/0056605 | A1* | 3/2006 | Whitfield | H04L 63/0428 379/106.01 |
| 2006/0115084 | A1* | 6/2006 | Ryu | H04H 60/16 380/247 |
| 2009/0300365 | A1* | 12/2009 | Karmes | G06F 21/572 713/182 |
| 2011/0112969 | A1* | 5/2011 | Zaid | G06Q 10/02 705/50 |
| 2011/0320089 | A1* | 12/2011 | Lewis | G01C 21/32 701/29.6 |
| 2012/0191242 | A1* | 7/2012 | Outwater | G06Q 30/06 700/236 |
| 2013/0159717 | A1 | 6/2013 | Rabadi et al. | |
| 2013/0179689 | A1* | 7/2013 | Matsumoto | G06F 8/61 713/171 |
| 2014/0075198 | A1 | 3/2014 | Peirce et al. | |

* cited by examiner

VEHICLE SOFTWARE UPDATE VERIFICATION

TECHNICAL FIELD

This disclosure generally relates to verification of software updates provided to a vehicle using a user device associated with the vehicle.

BACKGROUND

To update a software version of a component of a vehicle, the vehicle may be driven to a dealership and serviced by a technician. The technician may utilize a system that tracks the individual software levels of every component in the vehicle as well as available software updates. The technician may manually apply the software updates indicated by the system and record any changes back into the system.

SUMMARY

In a first illustrative embodiment, a system includes a mobile device, associated with a vehicle for verification of software updates, configured to receive a message including an encryption key with which a software update for the vehicle is encrypted, provide a user interface requesting user verification of installation of the software update, and responsive to receipt of the user verification, provide the encryption key to the vehicle to allow the vehicle to decrypt the software update.

In a second illustrative embodiment, a system includes a vehicle computing system configured to receive a software update from an update server, send a request to the update server requesting that an encryption key used to encrypt the software update be provided to a mobile device associated with the vehicle for verification of software updates, and responsive to receipt of user verification by the mobile device, receive the encryption key from the mobile device to decrypt the software update.

In a third illustrative embodiment, a system includes an update server configured to send a software update encrypted using an encryption key to a vehicle, receive a request from the vehicle requesting that the encryption key used to encrypt the software update be provided to a mobile device associated with the vehicle for verification of software updates, and send the encryption key to the mobile device responsive to the request.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Software updates may be delivered to a vehicle through various online mechanisms. For example, the vehicle may use an internal modem or a connected mobile device as a data connection to retrieve a software update over-the-air.

To ensure security of the software update, as well as to ensure that unauthorized updates are not maliciously provided to the vehicle, the update server may be configured to encrypt the software update for decryption by the vehicle. The encryption may be performed using an encryption factor such as a symmetric key that is known to the vehicle and the update server, but not to third parties. Upon receiving the encrypted software update, the vehicle may use the encryption factor to decrypt the software update for installation.

To further improve the security of the software update, a second level or factor of the encryption may be performed using a second encryption factor that is unknown to the vehicle. For example, before encrypting the software update using the first factor, the update server may further encrypt the software update using a second factor (e.g., an asymmetric key). The vehicle may receive the encrypted update, and decrypt the update according to the first factor known to the vehicle. Then, to complete the decryption of the update file, the vehicle may request the second factor from the update server.

However, rather than providing the second factor to the vehicle, the update server may respond to the request by providing a message including the second factor to a phone or other mobile device associated with the vehicle. As some examples, the message may be provided to the associated device as a short message service (SMS) message or other type of instant message, or as a push notification to an application executed by the associated device. The associated device may receive the message including the second factor, and may provide the second factor to the vehicle to complete the decryption process. In some cases, the associated device may be configured to prompt the user for confirmation of the software update to be performed to the vehicle. As one possibility, the associated device may provide the second factor information to the vehicle if the user agreed to installation of the software update. As another possibility, the associated device may display the second factor information to the user, and if the user agrees to perform the update he or she may enter the second factor information into the vehicle.

Thus, by using the associated device, the system may ensure that only a whitelist of users, such as the vehicle owners, are able to update the vehicle software. If another user attempts to perform the firmware update, the owner's associated phone may request the user for permission to install the software update, thereby notifying the owner of the unauthorized update attempt.

Figure 1:
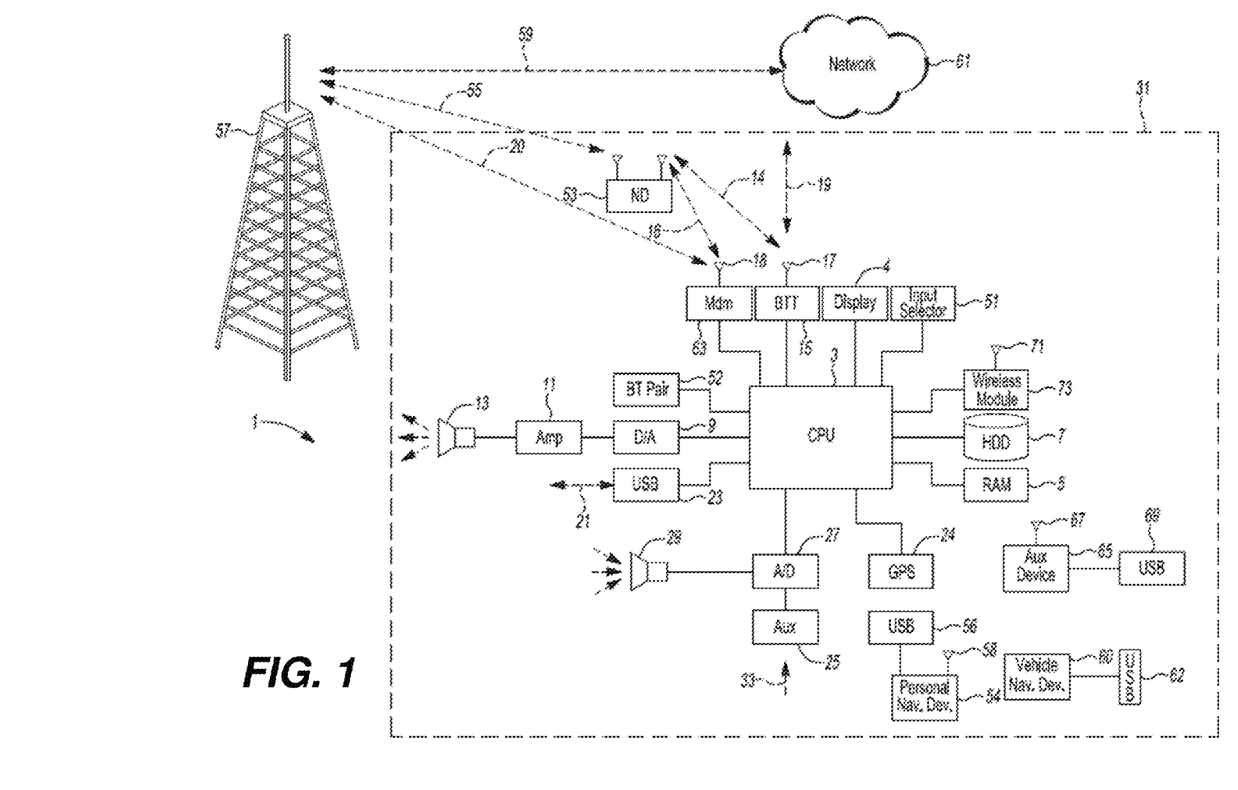
FIG. 1 illustrates an example block topology for a vehicle-based computing system for a vehicle.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, a screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof).

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a nomadic device (ND) 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by communication 14.

Pairing a nomadic device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or dual-tone multiple frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the nomadic device 53, it is possible that the data-plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless 67 or wired 69 connection. Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 itself is capable of performing the exemplary processes.

Figure 2:
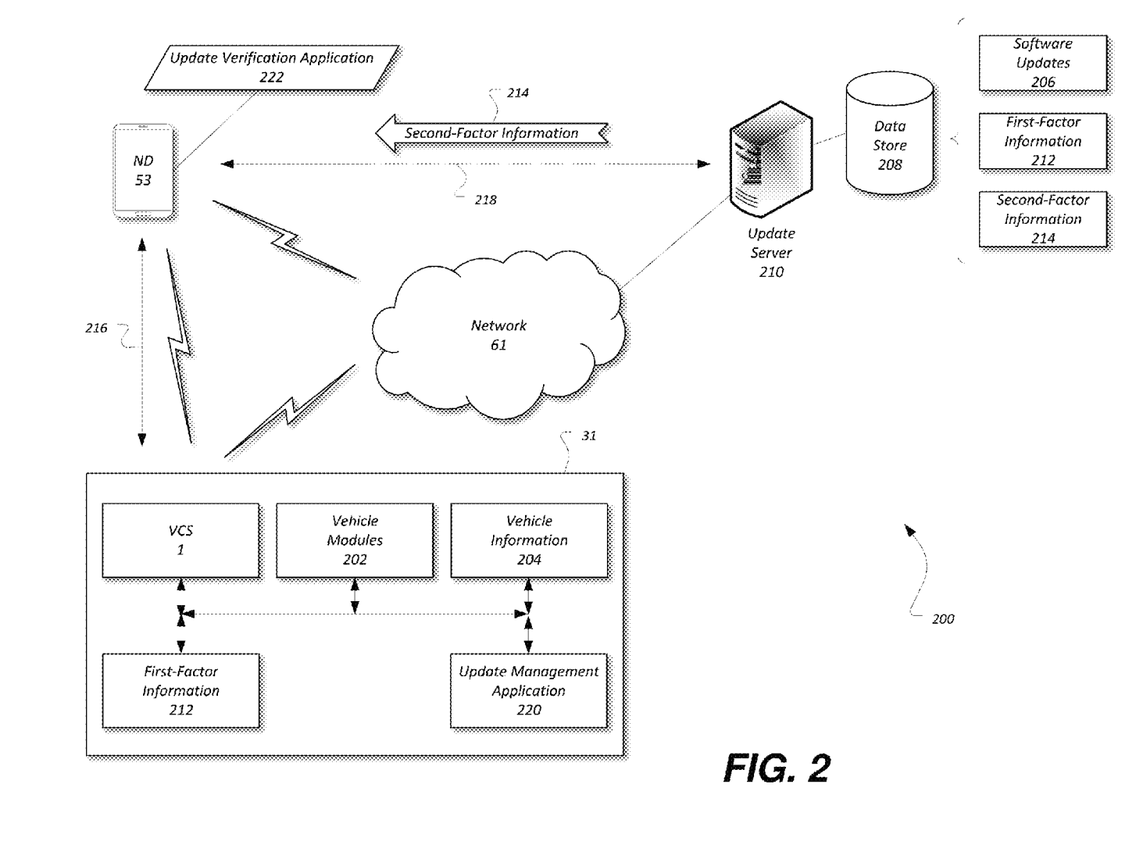
FIG. 2 illustrates an exemplary system for providing multi-factor verification of software update to the vehicle by way of a nomadic device.

FIG. 2 illustrates an exemplary system 200 for providing multi-factor verification of software updates 206 to the vehicle 31 by way of a nomadic device 53. The system 200 may include the VCS 1 in communication over the network 61 with an update server 210 (e.g., directly, or via the nomadic device 53). The update server 210 may communicate with a data store 208 configured to maintain software updates 206 for download, as well as first-factor information 212 and second-factor information 214 for encryption of the software update 206. The system 200 may further include an update management application 220 installed to the vehicle 31 and configured to install software updates 206 to the VCS 1 itself or to other modules 202 of the vehicle 31. The nomadic device 53 may be in communication with the update server 210 via a wide-area data connection 218 and with the update management application 220 of the VCS 1 via a local data connection 216. As explained in detail below, an update verification application 222 installed to the nomadic device 53 may be configured to be associated with the vehicle 31 for performing verification of software updates 206, receive the second-factor information 214 from the update server 210, confirm with a user of the nomadic device 53 that the software update 206 is to be installed, and provide the second-factor information 214 to the vehicle 31. While an exemplary system 200 is shown in FIG. 2, the exemplary components illustrated in the Figure are not intended to be limiting. Indeed, the system 200 may have more or fewer components, and additional or alternative components and/or implementations may be used.

The vehicle modules 202 may include various vehicle 31 components configured to receive updates of associated software, firmware, or configuration settings. As some non-limiting examples, the vehicle modules 202 may include a powertrain control module (PCM), a brake system control module (BSCM), a body control module (BCM), and the VCS 1 itself.

The vehicle information 204 may include information configured to identify the vehicle 31 or the vehicle 31 configuration. For example, the vehicle information 204 may include a vehicle identification number (VIN) published to the vehicle 31 CAN bus, or subscriber identity module (SIM) information of the modem 63 such as international mobile station equipment identity (IMEI). Additionally or alternately, the vehicle information 204 may include version information for at least a portion of the hardware and software components of the vehicle modules 202 of the vehicle 31.

The software updates 206 may include changes to the software or settings of the vehicle 31 to address an issue with the current software or settings, or to provide improved functionality to the current software. The software updates 206 may include, for example, updated configuration settings for one or more vehicle modules 202, and/or updated versions of software or firmware to be installed on one or more vehicle modules 202. In some cases software updates 206 may include a single section, while in other cases a software updates 206 may be organized into multiple subsections, partitions, or chunks, where all the subsections may be downloaded to complete the overall software update 206 to be installed.

The data store 208 may be configured to store the software updates 206. The data store 208 may be further configured to store additional information regarding the software updates 206. For example, the data store 208 may be configured to maintain indications of which vehicle module(s) 202 are associated with which software updates 206. The data store 208 may further store information indicative of the compatibility of the software updates 206 to vehicle model or configuration. For instance, a storage entry for a software update 206 may indicate that the software update 206 is compatible with a certain make and model of vehicle 31, or that it has a dependency on a version of another vehicle module 202 being of a particular version or versions.

The data store 208 may be further configured to store the first-factor information 212 and the second-factor information 214 used for encryption of the software updates 206. The first-factor information 212 may include information shared by the data store 208 and the vehicle 31 (such as a symmetric key used to encrypt software updates 206 for transport). In some cases, the first-factor information 212 may be maintained in persistent storage 7 of the vehicle 31, and may also be indexed in the data store 208 according to vehicle 31 identifier (e.g., VIN provided to the data store 208 as part of vehicle information 204). The second-factor information 214 may include additional information unknown to the vehicle 31 but required by the vehicle 31 to decrypt the software updates 206. In an example, the second-factor information 214 includes an asymmetric key used to encrypt the software updates 206.

The update server 210 may include one or more devices configured to serve the software updates 206 stored by the data store 208 to the vehicles 31. For example, the update server 210 may be configured to receive requests for available software updates 206 from vehicles 31. The requests may include vehicle information 204 to allow the update server 210 to query the data store 208 for software updates 206 applicable to the vehicle 31 as it is currently configured. The update server 210 may provide, responsive to the requests, indications of software updates 206 (or the software updates 206 themselves) to update the requesting vehicle 31 that may be downloaded and installed. The update server 210 may be further configured to encrypt the software updates 206 according to the first-factor information 212 and second-factor information 214, and provide the encrypted software updates 206 to devices requesting to download the software updates 206 according to the provided indications.

The VCS 1 may be configured to communicate with the update server 210 over the network 61. In some cases, the VCS 1 may make use of integrated network functionality of the VCS 1, such as the internal modem 63, to facilitate communication with the update server 210. In other cases, the VCS 1 may utilize a local data connection 216 to the nomadic device 53 to facilitate communication with the update server 210 via a wide-area data connection 218 of the nomadic device 53. As an example, for a nomadic device 53 running the Android operating system maintained by the Open Handset Alliance of Silicon Valley, Calif., the data connection 216 may be established via a wireless Bluetooth connection. As another example, for a nomadic device 53 running the iOS operating system maintained by Apple, Inc. of Cupertino, Calif., the data connection 216 may additionally or alternately be established over a wired USB connection (not shown). The nomadic device 53 may further be configured to establish a wide-area data connection 218 (e.g., an Internet connection) between the nomadic device 53 and the update server 210, such as a connection over the network 61. In some cases, the wide-area data connection 218 of the nomadic device 53 may be used by the VCS 1 to download the software updates 206 from the update server 210.

The update management application 220 may be configured to manage the installation of software updates 206 to the vehicle 31. For example, the update management application 220 of the VCS 1 may receive a command from a user requesting to check for software updates 206. As another possibility, the update management application 220 may trigger a periodic check for new software updates 206. When triggered, the update management application 220 may be configured to send a request to the update server 210 to inquire whether software updates 206 for the vehicle 31 are available. For example, the update management application 220 may query the update server 210 using the vehicle information 204 (or, if the data store 208 maintains current vehicle information 204, an identifier of the vehicle 31), and may receive a response from the update server 210 indicative of whether new software updates 206 for the vehicle 31 are available (e.g., as links or other identifiers of software updates 206 for the vehicle 31 to download). If the response to the update management application 220 indicates software updates 206 are available for the vehicle 31, the update management application 220 may be further configured to queue those software updates 206 to be downloaded and installed.

The update management application 220 may be configured to facilitate the downloading of the software updates 206 to the vehicle 31. For instance, the update management application 220 may be configured to receive a listing of the software update 206 identified by the update server 210 as being available for download and install. The update management application 220 may be further configured to detect when the nomadic device 53 is connected to the VCS 1, and perform downloading of the software update 206 when so connected.

The update management application 220 may be further configured to facilitate the decryption and installation of the downloaded software updates 206. For example, the update management application 220 may be configured to decrypt the downloaded software updates 206 according to the first-factor information 212 maintained by the vehicle 31 and used to encrypt information for transport between the vehicle 31 and the update server 210.

To facilitate the multi-factor verification of the downloaded software updates 206, the update management application 220 may be further configured to request the second-factor information 214 be delivered to the nomadic device 53 associated with the vehicle 31. The update server 210 accordingly may be configured to provide the second-factor information 214 to the associated nomadic device 53 responsive to a message received from the VCS 1. To identify the associated nomadic device 53, the data store 208 may be further configured to maintain the association of nomadic device 53 to vehicle 31 (e.g., mobile device numbers to VINs), and the update server 210 may be configured to access the data store 208 to retrieve the associated device information. As another possibility, the vehicle 31 may maintain the association of nomadic device 53, and may provide the associated device information in the message to the update server 210 requesting the second-factor information 214.

The update management application 220 may be further configured to utilize the update verification application 222 of the associated nomadic device 53 both to verify the software updates 206 for installation and also to provide the second-factor information 214 to the vehicle 31 to allow the update management application 220 to complete the decryption of the software updates 206 for installation. For example, the update verification application 222 may provide a user interface via the nomadic device 53, and may provide the second-factor information 214 to the update management application 220 if the user agrees to install the software update 206 to the vehicle 31. Further aspects of the verification are discussed in detail below with respect to FIGS. 3-8.

Figure 3:
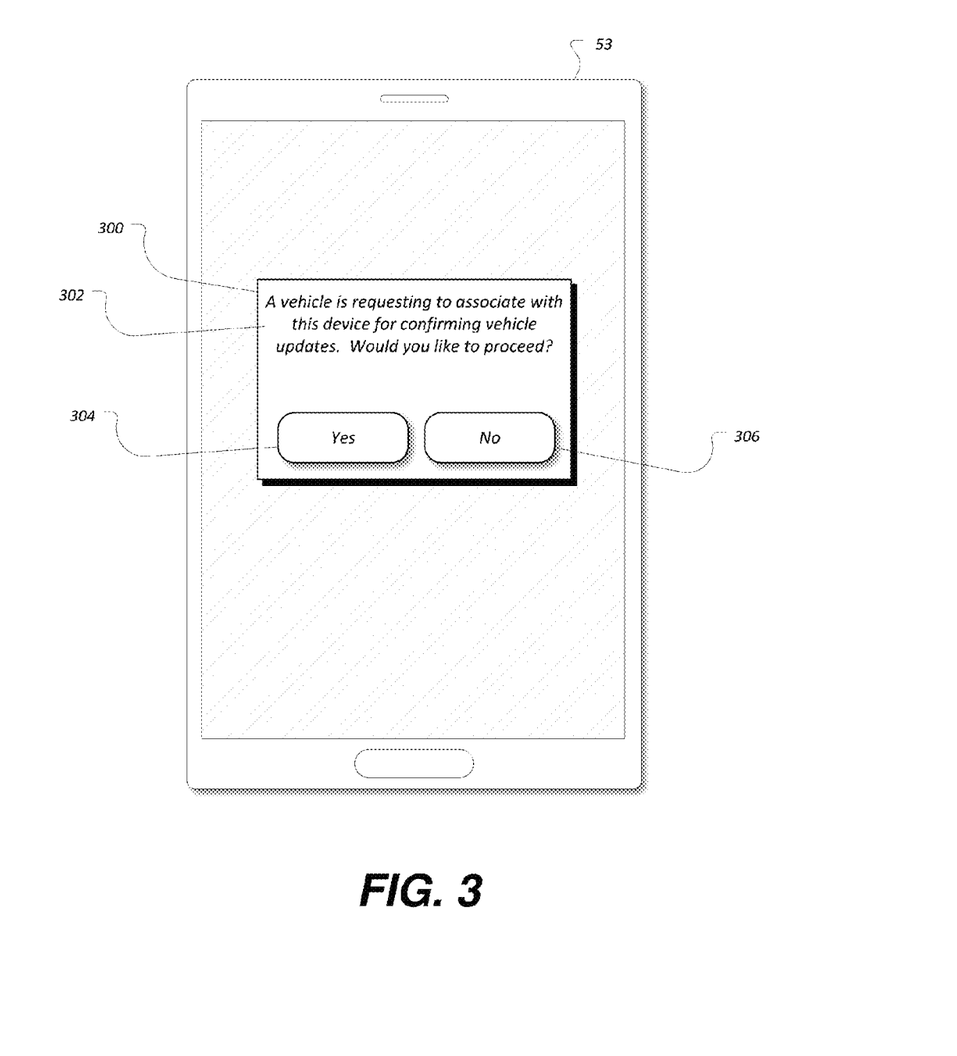
FIG. 3 illustrates an exemplary user interface for associating a nomadic device with a vehicle for verification of software updates.

FIG. 3 illustrates an exemplary user interface 300 for associating the nomadic device 53 with the vehicle 31 for verification of software updates 206. As illustrated, the user interface 300 may be presented to the user via a display of the nomadic device 53. As another possibility, the user interface 300 may be provided to the user via a display 4 of the VCS 1. The user interface 300 may be displayed upon various conditions, such as when the nomadic device 53 is connected to the vehicle 31 for the first time, when the nomadic device 53 is connected to the vehicle 31 and the vehicle 31 has no nomadic devices 53 associated with verification of software updates 206, or upon user selection of a function to update the nomadic devices 53 configured for verification of software updates 206 for the vehicle 31.

The user interface 300 may include a message prompt 302 requesting for the user to confirm or deny that the vehicle 31 and the nomadic device 53 should be associated for verification of software update 206. The user interface 300 may further includes controls to receive user input regarding whether the devices should be associated, such as a yes control 304 for accepting the association of the devices, and a no control 306 for rejecting the association. If the user selects the yes control 304, the nomadic device 53 may be associated with the vehicle 31 for receiving the second-factor information 214 as well as for prompting the user for verification that may be required before forwarding the second-factor information 214 to the vehicle 31. If the user selects the no control 306, the nomadic device 53 may not be associated with the vehicle 31, and any existing association between the vehicle 31 and the nomadic device 53 may be removed.

Figure 4:
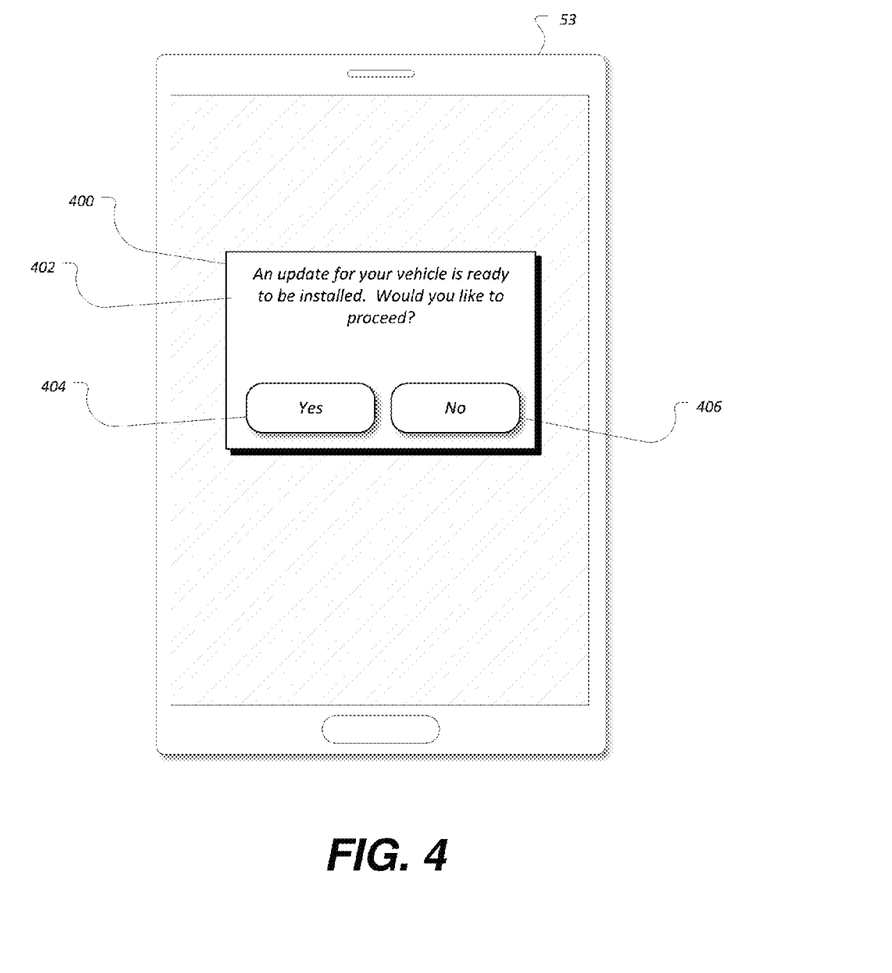
FIG. 4 illustrates an exemplary user interface for using the nomadic device to confirm installation of software updates.

FIG. 4 illustrates an exemplary user interface 400 for using the nomadic device to confirm installation of software updates. As illustrated, the user interface 400 may be presented to the user via a display of the nomadic device 53. The user interface 400 may be displayed upon various conditions, such as upon receiving second-factor information 214 from the update server 210, or upon connection of the nomadic device 53 to the vehicle 31 after having received second-factor information 214 from the update server 210.

The user interface 400 may include a message prompt 402 requesting for the user to verify or reject that the vehicle 31 should install a pending software update 206. The user interface 400 may further includes controls to receive user input regarding whether the software update 206 should be installed, such as a yes control 404 for accepting the association of the devices, and a no control 406 for rejecting the association. (In some cases, the user interface 400 may include additional choices, such as a control for requesting that the user interface 400 be provided again at a later time.) When the user selects the yes control 404, the nomadic device 53 may provide the second-factor information 214 to the vehicle 31 (e.g., responsive to the selection, when the nomadic device 53 is next connected to the vehicle 31 via the data connection 216, etc.).

Figure 5A:
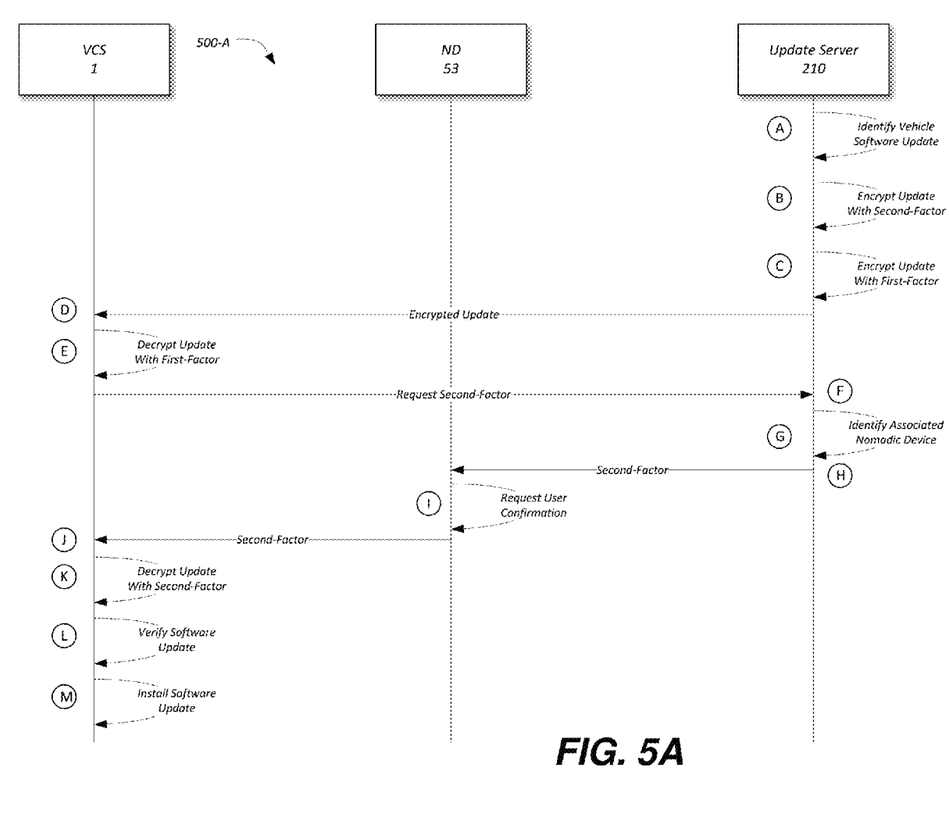
FIG. 5A illustrates an exemplary data flow for providing multi-factor verification of software update to the vehicle by way of a nomadic device.

FIG. 5A illustrates an exemplary data flow 500-A for providing multi-factor verification of software update 206 to the vehicle 31 by way of the nomadic device 53. In the exemplary data flow 500-A, the vehicle 31 may decrypt and install software updates 206 received from the update server 210 based on first-factor information 212 maintained by the vehicle 31 and second-factor information 214 requested by the vehicle 31 upon decryption of the first-level decryption of the software update 206.

More specifically, at time index (A), the update server 210 identifies software updates 206 that should be installed to the vehicle 31. For example, when the vehicle 31 is assembled, the vehicle 31 may include various hardware and software components. Upon or after assembly, the VCS 1 of the vehicle 31 may be configured to query for existence and version information for at least a portion of these hardware and software components of the vehicle 31. Using the queried information and additional information identifying the specific vehicle 31 (e.g., VIN information published on the CAN bus, subscriber identity module (SIM) information of the modem 63 such as international mobile station equipment identity (IMEI), etc.), the VCS 1 may communicate via the network 61 to establish an account with update server 210. The update server 210 may receive these communications from the vehicles 31, and may maintain in the data store 208 the hardware configurations and software (e.g., firmware, etc.) versions linked to identifiers of the vehicles 31. Based on the current vehicle configuration information, the update server 210 may be configured to determine that there are software updates 206 available to update an old version of software installed to one of the vehicle modules 202 from the version specified in the data store 208 to a more recent version. As another example, the vehicle 31 may determine, based on querying the update server 210 or another source, that software updates 206 should be installed to the vehicle 31, and may provide a message to the update server 210 requesting the software updates 206.

At time index (B), the update server 210 encrypts the identified software updates 206 using the second-factor information 214. For example, the update server 210 may generate or otherwise identify the second-factor information 214 to use to encrypt the identified software updates 206, and may encrypt the identified software updates 206 using the second-factor information 214. In an example, the second-factor information 214 is an asymmetric key, and the encryption is performed using an asymmetric encryption scheme. In another example, the second-factor information 214 is a symmetric key, and the encryption is performed using a symmetric encryption scheme.

At time index (C), the update server 210 further encrypt the software update 206 using first-factor information 212 associated with the vehicle 31. In an example, the first-factor information 212 includes a symmetric key used to encrypt data for transport to the vehicle 31, where the symmetric key is stored by the vehicle 31.

At time index (D), the update server 210 provides the encrypted software update 206 to the vehicle 31. The VCS 1 of the vehicle 31 may accordingly receive the software update 206 over the network 61, and may provide the update to the update management application 220 for processing. In some cases, the software update 206 may be downloaded to the vehicle 31 by way of the data connection of the nomadic device 53, while in other cases the software update 206 may be downloaded to the vehicle 31 by way of an internal modem of the vehicle 31.

At time index (E), the vehicle 31 performs a first-level decryption of the software update 206. For example, the update management application 220 may utilize the first-factor information 212 maintained by the vehicle 31 to decrypt the encryption performed by the update server 210 at time index (C).

At time index (F), the vehicle 31 sends a request to the update server 210 requesting the second-factor information 214 to complete the decryption of the software update 206. For example, the update management application 220 may send the request to the update server 210 upon successful decryption of the software update 206 using the first-factor information 212. The request may include, for example, one or more vehicle 31 identifier such as VIN. The request may further include an indication of the software update 206 for which the second-factor information 214 is being requested.

At time index (G), the update server 210 identifies the nomadic device 53 associated with the vehicle 31 configured to receive the second-factor information 214. For example, based on information included in the request, the update server 210 may access the data store 208 to identify the nomadic device 53 previously associated with the vehicle 31 for verifying the software update 206. (An exemplary user interface 300 for the association of nomadic devices 53 with vehicles 31 discussed above with respect to FIG. 3.)

At time index (H), the update server 210 provides the second-factor information 214 to the nomadic device 53 associated with the vehicle 31. The update verification application 222 of the nomadic device 53 may receive the second-factor information 214.

At time index (I), the nomadic device 53 provides a user interface on the nomadic device 53 to confirm installation of the software update 206. For example, the update verification application 222 may provide a user interface on the nomadic device 53 requesting the user's permission to install the software update 206 downloaded by the vehicle 31. An exemplary user interface 400 for the verification of installation of software updates 206 is discussed above respect to FIG. 4. In other examples, the user interface may display the second-factor information 214 (e.g., as a code to be entered), such that the user of the nomadic device 31 may manually provide the second-factor information 214 to the VCS 1.

If the user approves installation of the software update 206, the data flow continues to time index (J), where the update verification application 222 provides the second-factor information 214 to the vehicle 31. If the user does not give permission, then the update verification application 222 does not provide the second-factor information 214 to the VCS 1, preventing the vehicle 31 from being able to decrypt or install the software update 206. Rather, the update verification application 222 may instead notify the vehicle 31 that the software update 206 was rejected by the user of the nomadic device 53. In some cases, the vehicle 31 may provide a notification in a display of the vehicle 31 to inform vehicle 31 occupants that the software update 206 was rejected.

At time index (K), the vehicle 31 performs a second-level decryption of the software update 206. For example, the update management application 220 may utilize the second-factor information 214 received at time index (J) to decrypt the encryption performed by the update server 210 at time index (B).

At time index (L), the vehicle 31 performs verification of the contents of the decrypted software update 206. This may be done, for example, by the update management application 220 to ensure that the second-factor information 214 did properly decrypt the software update 206, and to verify the integrity of the software update 206 as decrypted. To perform the verification, the update management application 220 may verify the decrypted software update 206 by computing a cryptographic hash value for the decrypted software update 206 (e.g., using MD5), and compare the computed value with a value for the software update 206 requested from or otherwise received from the update server 210. If the software update 206 fails verification, then the update management application 220 does not install the software update 206.

At time index (M), the vehicle 31 installs the decrypted software update 206. For example, the update management application 220 may determine from the software update 206 an intended module 202 of the vehicle 31 to which the software update 206 is to be applied. As one possibility, the software update 206 may include a module address or other identifier configured to allow the VCS 1 to identify which module 202 of the vehicle 31 should receive the software update 206, such that the VCS 1 may route the software update 206 to the proper module 202 (or may install the update to the VCS 1 itself).

Figure 5B:
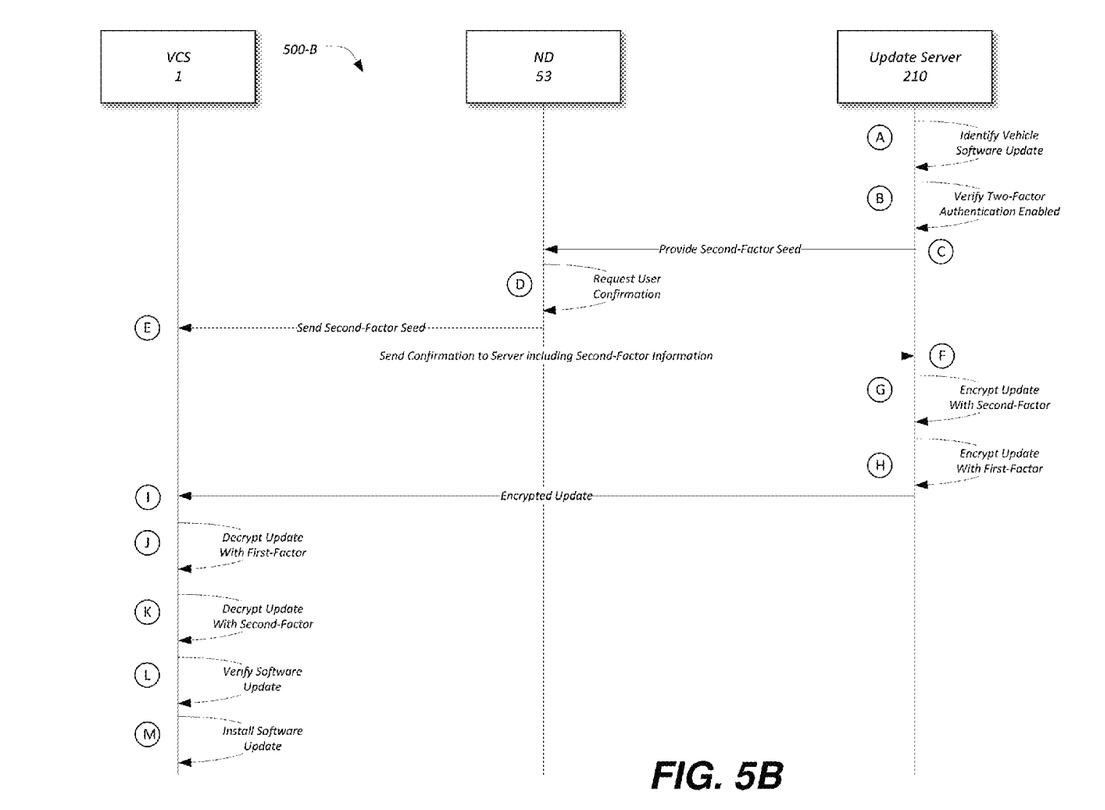
FIG. 5B illustrates an alternate exemplary data flow for providing multi-factor verification of software update to the vehicle by way of a nomadic device.

FIG. 5B illustrates an alternate exemplary data flow 500-B for providing multi-factor verification of software update 206 to the vehicle 31 by way of the nomadic device 53. The exemplary data flow 500-B includes some similarity to that of data flow 500-A. However, in the data flow 500-B as compared to the data flow 500-A, the vehicle 31 receives the second-factor information 214 via the nomadic device 53 before receiving the software updates 206, and provides the second-factor information 214 to the update server 210 to request the software updates 206 to be installed.

At time index (A), the update server 210 identifies software updates 206 that should be installed to the vehicle 31. At time index (B), the update server 210 determines whether two-factor authentication is enabled. For example, the update server 210 may utilize records of the data store 208 to identify that a nomadic device 53 is associated with the vehicle 31 for confirming installation of software updates 206. If no nomadic device 53 is associated or if two-factor authentication is otherwise disabled, then the data flow 500-B ends (or transitions to a data flow not requiring two-factor authentication, not shown).

At time index (C), the update server 210 provides the second-factor information 214 to the nomadic device 53 associated with the vehicle 31. The update verification application 222 of the nomadic device 53 may receive the second-factor information 214. At time index (D), the nomadic device 53 provides a user interface (e.g., the user interface 400) on the nomadic device 53 to confirm installation of the software update 206.

If the user approves installation of the software update 206, the data flow continues to time index (E), where the update verification application 222 provides the second-factor information 214 to the vehicle 31. If the user does not give permission, then the update verification application 222 does not provide the second-factor information 214 to the VCS 1, preventing the vehicle 31 from requesting the software update 206 from the update server 210. Rather, the update verification application 222 may instead notify the vehicle 31 that the software update 206 was rejected by the user of the nomadic device 53. In some cases, the vehicle 31 may provide a notification in a display of the vehicle 31 to inform vehicle 31 occupants that the software update 206 was rejected.

At time index (F), the vehicle 31 provides a confirmation to the update server 210 including the second-factor information 214. For example, the update management application 220 may provide the second-factor information 214 received at time index (E) to the update server 210 in a request to receive the software updates 206.

At time index (G), the update server 210 encrypts the identified software updates 206 using the second-factor information 214. At time index (H), the update server 210 further encrypt the software update 206 using first-factor information 212 associated with the vehicle 31. At time index (I), the update server 210 provides the encrypted software update 206 to the vehicle 31. The VCS 1 of the vehicle 31 may accordingly receive the software update 206 over the network 61, and may provide the update to the update management application 220 for processing.

At time index (J), the vehicle 31 performs a first-level decryption of the software update 206. For example, the update management application 220 may utilize the first-factor information 212 maintained by the vehicle 31 to decrypt the encryption performed by the update server 210 at time index (H). At time index (K), the vehicle 31 performs a second-level decryption of the software update 206. For example, the update management application 220 may utilize the second-factor information 214 received at time index (E) to decrypt the encryption performed by the update server 210 at time index (G). At time index (L), the vehicle 31 performs verification of the contents of the decrypted software update 206. At time index (M), the vehicle 31 installs the decrypted software update 206.

Figure 5C:
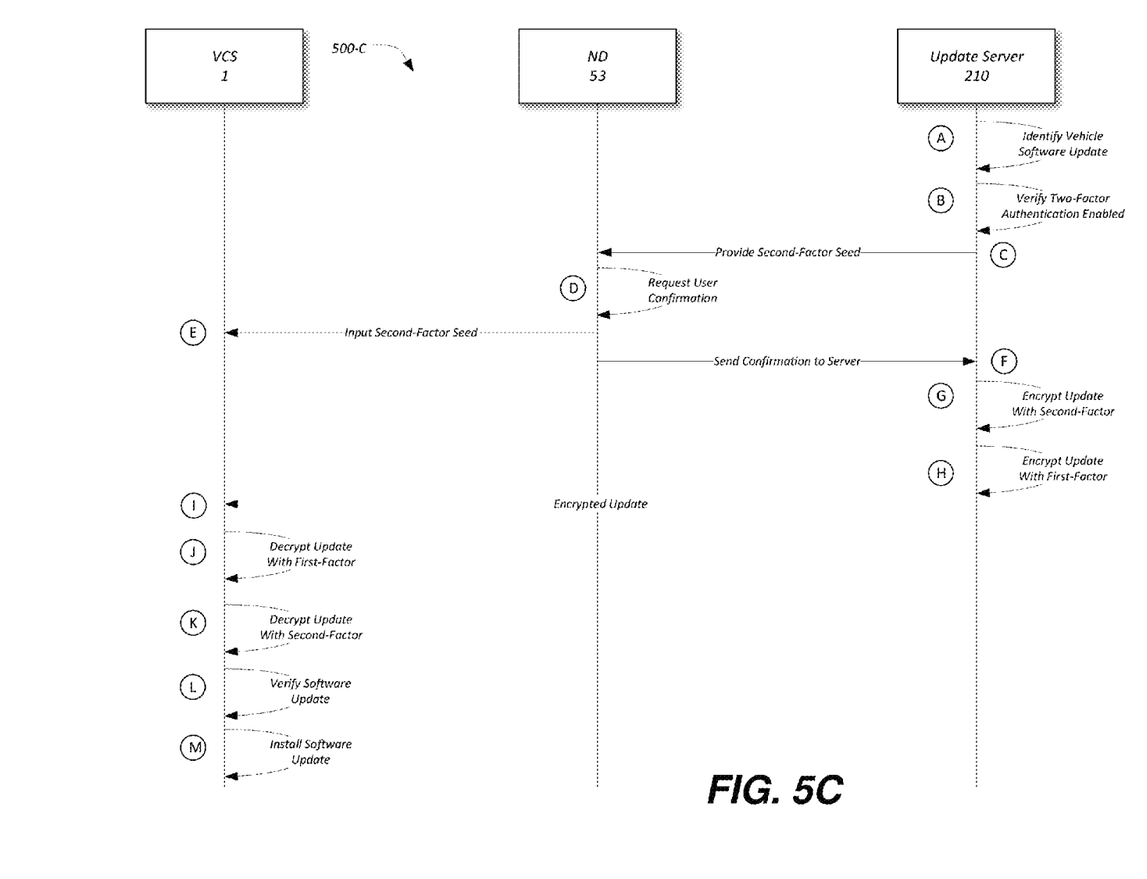
FIG. 5C illustrates an additional alternate exemplary data flow for providing multi-factor verification of software update to the vehicle by way of the nomadic device.

FIG. 5C illustrates an additional alternate exemplary data flow 500-B for providing multi-factor verification of software update 206 to the vehicle 31 by way of the nomadic device 53. In the exemplary data flow 500-C, the vehicle 31 may receive manual entry of the second-factor information 214 via an operator of the nomadic device 53 and the vehicle 31, and may provide the second-factor information 214 to the update server 210 to request the software updates 206 to be installed.

Similar to as discussed above with respect to the data flow 500-B, at time index (A), the update server 210 identifies software updates 206 that should be installed to the vehicle 31. At time index (B), the update server 210 determines whether two-factor authentication is enabled. At time index (C), the update server 210 provides the second-factor information 214 to the nomadic device 53 associated with the vehicle 31. At time index (D), the nomadic device 53 provides a user interface (e.g., the user interface 400) on the nomadic device 53 to confirm installation of the software update 206.

However, at time index (E), rather than providing the second-factor information 214 to the vehicle 31 responsive to confirmation of installation of the software update 206, in the exemplary data flow 500-C, the nomadic device 53 displays the second-factor information 214 to the user, and the user manually enters the second-factor information 214 into the vehicle 31. At time index (F), the nomadic device 53 provides confirmation to the update server 210 that the second-factor information 214 has been provided to the vehicle 31 (e.g., based on user input to the user interface of the nomadic device 53 indicating that the second-factor information 214 has been provided to the vehicle 31.

Similar to as discussed above with respect to the data flow 500-B, at time index (G), the update server 210 encrypts the identified software updates 206 using the second-factor information 212. At time index (H), the update server 210 further encrypt the software update 206 using first-factor information 212 associated with the vehicle 31. At time index (I), the update server 210 provides the encrypted software update 206 to the vehicle 31. At time index (J), the vehicle 31 performs a first-level decryption of the software update 206. At time index (K), the vehicle 31 performs a second-level decryption of the software update 206. At time index (L), the vehicle 31 performs verification of the contents of the decrypted software update 206. At time index (M), the vehicle 31 installs the decrypted software update 206.

Figure 6:
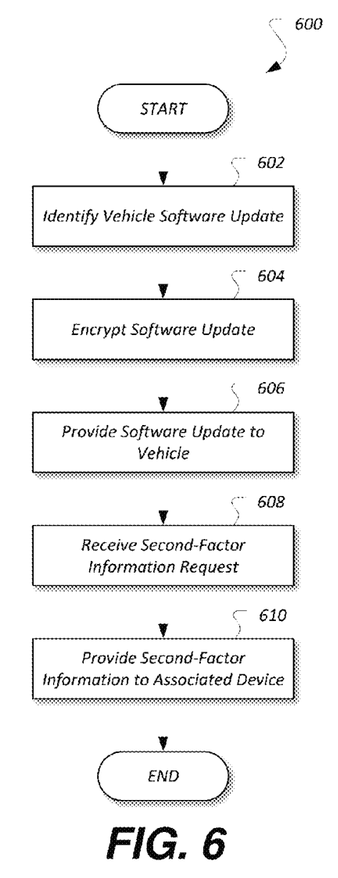
FIG. 6 illustrates an exemplary process for providing multi-factor encrypted software updates to the vehicle.

FIG. 6 illustrates an exemplary process 600 for providing multi-factor encrypted software updates 206 to the vehicle 31. The process 600 may be performed, for example, by the update server 210 in communication with the vehicle 31 over the network 61.

At operation 602, the update server 210 identifies a software update 206 for a vehicle 31. For example, based on the current vehicle configuration information, the update server 210 may be configured to determine that there are software updates 206 available to update an old version of software installed to one of the vehicle modules 202 from the version specified in the data store 208 to a more recent version. As another example, the vehicle 31 may determine, based on querying the update server 210 or another source, that software updates 206 should be installed to the vehicle 31, and may provide a message to the update server 210 requesting the software updates 206.

At operation 604, the update server 210 encrypts the software update 206. For example, the update server 210 may generate or otherwise identify the second-factor information 214 to use to encrypt the identified software updates 206, and may encrypt the identified software updates 206 using the second-factor information 214. The update server 210 may further encrypt the software update 206 using first-factor information 212 associated with the vehicle 31.

At operation 606, the update server 210 provides the software update 206 to the vehicle 31. For example, the update server 210 may provide the software update 206 over the network 61 to the update management application 220 of the VCS 1 of the vehicle 31 for which the software update 206 is indicated. In some cases, the software update 206 may be provided from the update server 210 to the vehicle 31 by way of the data connection of the update server 210 to the nomadic device 53, while in other cases the software update 206 may be provided from the update server 210 to the vehicle 31 by way of an internal modem of the vehicle 31.

At operation 608, the update server 210 receives a request for the second-factor information 214 used to encrypt the software update 206. For example, the update server 210 may receive a request for the second-factor information 214 to be used to decrypt the software update 206.

At operation 610, the update server 210 provides the second-factor information 214 to the nomadic device 53 associated with the vehicle 31 for verifying software updates 206. For example, based on information included in the request and/or maintained by the data store 208, the update server 210 may identify the nomadic device 53 associated with the vehicle 31 for verifying the software update 206. The update server 210 may then provide the second-factor information 214 to the nomadic device 53 associated with the vehicle 31. After operation 610, the process 600 ends.

Figure 7:
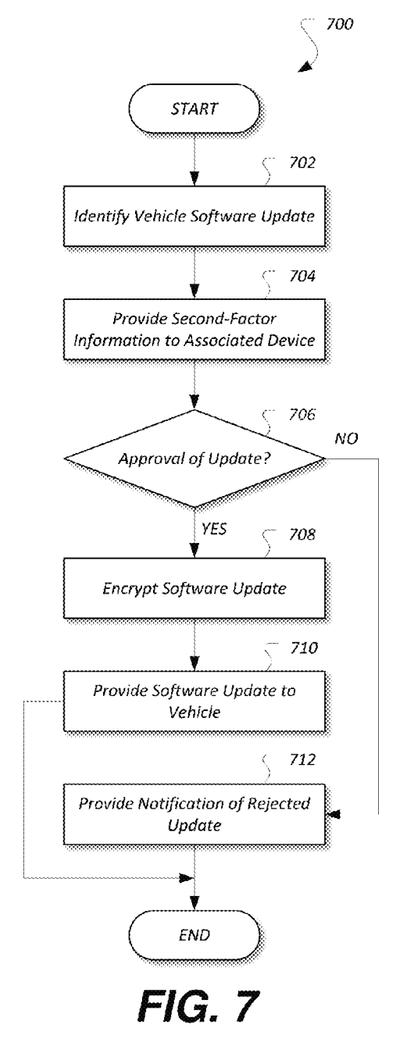
FIG. 7 illustrates an alternate exemplary process for providing multi-factor encrypted software updates to the vehicle.

FIG. 7 illustrates an alternate exemplary process 700 for providing multi-factor encrypted software updates 206 to the vehicle 31. As with the process 600, the process 700 may be performed, for example, by the update server 210 in communication with the vehicle 31 over the network 61.

At operation 702, the update server 210 identifies a software update 206 for a vehicle 31. For example, based on the current vehicle configuration information, the update server 210 may be configured to determine that there are software updates 206 available to update an old version of software installed to one of the vehicle modules 202 from the version specified in the data store 208 to a more recent version. As another example, the vehicle 31 may determine, based on querying the update server 210 or another source, that software updates 206 should be installed to the vehicle 31, and may provide a message to the update server 210 requesting the software updates 206.

At operation 704, the update server 210 provides second-factor information 214 to the nomadic device 53 associated with the vehicle 31 for verifying software updates 206. For example, based on information included in the request and/or maintained by the data store 208, the update server 210 may identify the nomadic device 53 associated with the vehicle 31 for verifying the software update 206. The update server 210 may then generate or otherwise identify the second-factor information 214 to use to encrypt the identified software updates 206, and may provide the second-factor information 214 to the nomadic device 53 associated with the vehicle 31.

At operation 706, the update server 210 determines whether the software update 206 is approved for installation. For example, the update verification application 222 of the nomadic device 53 may provide a user interface on the nomadic device 53 requesting the user's permission to install the software update 206 downloaded by the vehicle 31. An exemplary user 400 interface for the verification of installation of software updates 206 is discussed above respect to FIG. 4. The nomadic device 53 may return the result to the update server 210. If the user approves installation of the software update 206, control passes to operation 708. Otherwise, control passes to operation 712.

At operation 708, the update server 210 encrypts the software update 206. For example, the update server 210 may encrypt the identified software updates 206 using the second-factor information 214. The update server 210 may further encrypt the software update 206 using first-factor information 212 associated with the vehicle 31.

At operation 710, the update server 210 provides software update 206 to the vehicle 31. For example, the update server 210 may provide the software update 206 over the network 61 to the update management application 220 of the VCS 1 of the vehicle 31 for which the software update 206 is indicated. In some cases, the software update 206 may be provided from the update server 210 to the vehicle 31 by way of the data connection of the update server 210 to the nomadic device 53, while in other cases the software update 206 may be provided from the update server 210 to the vehicle 31 by way of an internal modem of the vehicle 31. After operation 710, the process 700 ends.

At operation 712, the update server 210 provides a notification to the vehicle 31 that the software update 206 was not approved for installation. In some cases, the vehicle 31 may provide a notification in a display of the vehicle 31 to inform vehicle 31 occupants that the software update 206 was rejected. After operation 712, the process 700 ends.

Figure 8:
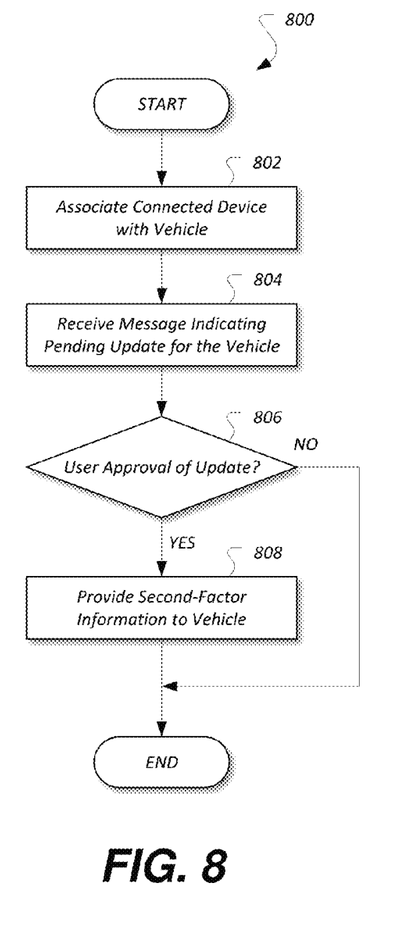
FIG. 8 illustrates an exemplary process for confirming installation of software updates to the vehicle.

FIG. 8 illustrates an exemplary process 800 for confirming installation of software updates 206 to the vehicle 31. The process 800 may be performed, for example, by the nomadic device 53 executing the update verification application 222 and configured for communication with the vehicle 31 and the update server 210.

At operation 802, the nomadic device 53 associates with the vehicle 31 for verification of the software updates 206. For example, the update verification application 222 of the nomadic device 53 may provide the user interface 300 to the user via a display of the nomadic device 53, and may receive user input from the yes control 304 accepting the association of the nomadic device 53 with the vehicle 31. In some cases, information indicative of the association may be provided to the data store 208 (e.g., via the update server 210) for later use, while in other cases, information indicative of the association may be maintained by the vehicle 31.

At operation 804, the nomadic device 53 receives a message indicating a pending software update 206 for the vehicle 31. For example, the update server 210 may provide the second-factor information 214 to the update verification application 222 of the nomadic device 53 associated with the vehicle 31.

At operation 806, the nomadic device 53 requests verification of the software update 206 installation from the user. For example, the update verification application 222 of the nomadic device 53 may provide a user interface on the nomadic device 53 requesting the user's permission to install the software update 206 downloaded by the vehicle 31. An exemplary user 400 interface for the verification of installation of software updates 206 is discussed above respect to FIG. 4. If the user approves installation of the software update 206, control passes to operation 808. Otherwise, the process 800 ends.

At operation 808, the nomadic device 53 provides the second-factor information 214 to the vehicle 31. For example, the update verification application 222 of the nomadic device 53 may provide the second-factor information 214 to the vehicle 31 over the local data connection 216. As another example, the second-factor information 214 may be displayed on a user interface of the nomadic device 53 (e.g., as a code to be entered), and manually entered by the user into the VCS 1. After operation 808, the process 800 ends.

Figure 9:
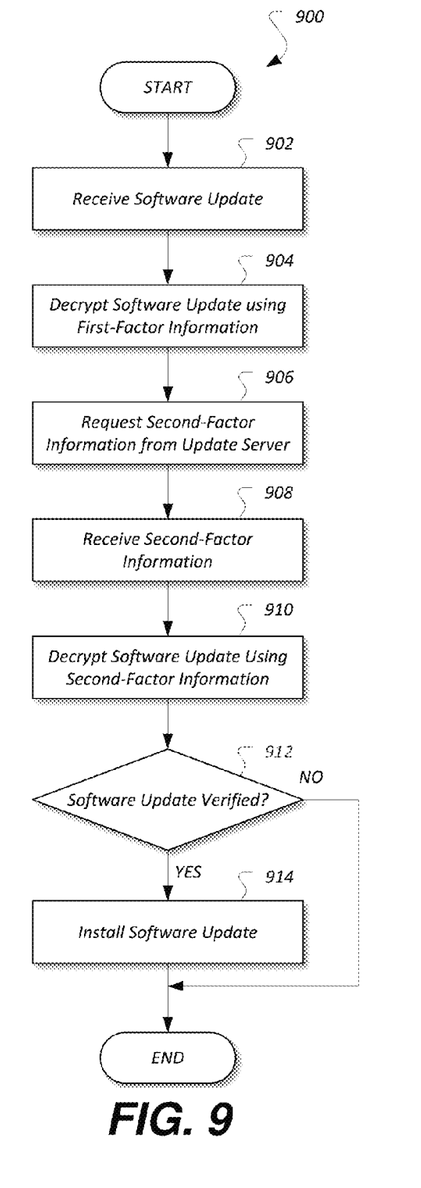
FIG. 9 illustrates an exemplary process for installing multi-factor encrypted software updates by the vehicle.

FIG. 9 illustrates an exemplary process 900 for installing multi-factor encrypted software updates 206 by the vehicle 31. The process 900 may be performed, for example, by the VCS 1 of the vehicle 31 executing the update management application 220 and configured for communication with the nomadic device 53 and the update server 210.

At operation 902, the vehicle 31 receives a software update 206. For example, the VCS 1 of the vehicle 31 may receive the software update 206 over the network 61, and may provide the update to the update management application 220 for processing. In some cases, the software update 206 may be downloaded to the vehicle 31 by way of the data connection of the nomadic device 53, while in other cases the software update 206 may be downloaded to the vehicle 31 by way of an internal modem of the vehicle 31.

At operation 904, the vehicle 31 decrypts the first level of encryption of the software update 206 using the first-factor information 212. For example, the update management application 220 may utilize the first-factor information 212 maintained by the vehicle 31 to decrypt the first level of encryption performed by the update server 210.

At operation 906, the vehicle 31 requests the second-factor information 214 from the update server 210. For example, the update management application 220 may send the request to the update server 210 upon successful decryption of the software update 206 using the first-factor information 212. The request may include, for example, one or more vehicle 31 identifier such as VIN. The request may further include an indication of the software update 206 for which the second-factor information 214 is being requested. In some cases, the request may also include an indication of the associated nomadic device 53 to be used by the update server 210 in responding to the request, while in other cases the update server 210 may identify the associated nomadic device 53 using other information included in the request (e.g., VIN) and associated device information maintained by the data store 208.

At operation 908, the vehicle 31 receives the second-factor information 214 from the associated nomadic device 53. For example, the update management application 220 may receive the second-factor information 214 from the update verification application 222 of the nomadic device 53 upon verification by the user of the nomadic device 53 that the software update 206 should be installed. In some cases, the second-factor information 214 may be provided to the update management application 220 over the local data connection 216, while in other cases, the second-factor information 214 may be displayed on a user interface of the nomadic device 53 (e.g., as a code to be entered), and manually entered by the user into the VCS 1.

At operation 910, the vehicle 31 decrypts the second level of encryption of the software update 206 using the second-factor information 214. For example, the update management application 220 may utilize the second-factor information 214 received from the nomadic device 53 to complete the decryption of the encryption performed by the update server 210 to the software update 206.

At operation 912, the vehicle 31 performs verification of the contents of the decrypted software update 206. For example, the update management application 220 may verify the decrypted software update 206 by computing a cryptographic hash value for the decrypted software update 206 (e.g., using MD5), and compare the computed value with a value for the software update 206 requested from or otherwise received from the update server 210. If the software update is verified, control passes to operation 912. Otherwise, the process 900 ends. In some cases, the update management application 220 may be configured to provide a message in the user interface of the vehicle 31 if the software update 206 fails verification. In some cases, the update management application 220 may pass control to operation 902 to attempt to retrieve the software update 206 again for software updates 206 that fail verification.

At operation 914, the vehicle 31 installs the software update 206. For example, the update management application 220 may determine from the software update 206 an intended module 202 of the vehicle 31 to which the software update 206 is to be applied. As one possibility, the software update 206 may include a module address or other identifier configured to allow the VCS 1 to identify which module 202 of the vehicle 31 should receive the software update 206, such that the VCS 1 may route the software update 206 to the proper module 202 (or may install the update to the VCS 1 itself). After operation 912, the process 900 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a mobile device, associated with a vehicle for verification of software updates, programmed to
responsive to receipt of an encryption key with which a software update downloaded to the vehicle is encrypted and decryption of the software update by the vehicle using an additional decryption key, display a user interface requesting user verification of installation of the software update; and
responsive to receipt of the user verification, provide the encryption key to the vehicle to allow the vehicle to further decrypt the software update for installation.

2. The system of claim 1, wherein the mobile device is further configured to:
present a user interface requesting confirmation that the vehicle and the mobile device should be associated for verification of software updates, and
responsive to receipt of confirmation of the association from the user interface, provide an indication to the vehicle that the mobile device is associated with the vehicle for verification of software updates.

3. The system of claim 1, wherein the software update is received by the vehicle from an update server, and the encryption key is a symmetric key with which the update server encrypted the software update.

4. The system of claim 3, wherein the encryption key is received by short message service (SMS) message from the update server.

5. A method for a mobile device, comprising:
responsive to receiving an encryption key with which a software update downloaded to a vehicle is encrypted and decrypting the software update by the vehicle using an additional decryption key, displaying a user interface requesting user verification for installing the software update; and
responsive to receiving the user verification, providing the encryption key to the vehicle allowing the vehicle to further decrypt the software update for installation.

6. The method of claim 5, further comprising:
presenting a user interface requesting confirmation that the vehicle and the mobile device should be associated for verification of software updates; and
responsive to receipt of confirmation of the association from the user interface, providing an indication to the vehicle that the mobile device is associated with the vehicle for verification of software updates.

7. The method of claim 5, wherein the software update is received by the vehicle from an update server, and the encryption key is a symmetric key with which the update server encrypted the software update.

8. The method of claim 7, wherein the encryption key is received by short message service (SMS) message from the update server.

9. A non-transitory computer-readable medium comprising instructions that, when executed by a processor of a mobile device, cause the processor to:
responsive to receipt of an encryption key with which a software update downloaded to a vehicle is encrypted and decryption of the software update by the vehicle using an additional decryption key, display a user interface requesting user verification of installation of the software update; and
responsive to receipt of the user verification, provide the encryption key to the vehicle to allow the vehicle to further decrypt the software update for installation.

10. The medium of claim 9, further comprising instructions to cause the processor to:
present a user interface requesting confirmation that the vehicle and the mobile device should be associated for verification of software updates; and
responsive to receipt of confirmation of the association from the user interface, provide an indication to the vehicle that the mobile device is associated with the vehicle for verification of software updates.

11. The medium of claim 9, wherein the software update is received by the vehicle from an update server, and the encryption key is a symmetric key with which the update server encrypted the software update.

12. The medium of claim 11, wherein the encryption key is received by short message service (SMS) message from the update server.

* * * * *